Sept. 30, 1969
A. H. HOFFMAN
3,470,435
SYNCHRONOUS MOTOR FIELD CONTROL CIRCUIT
Filed June 6, 1967
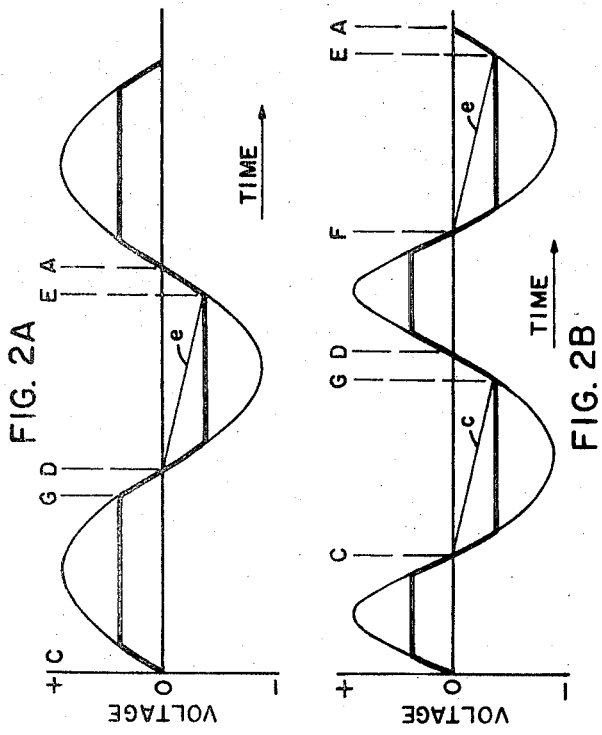
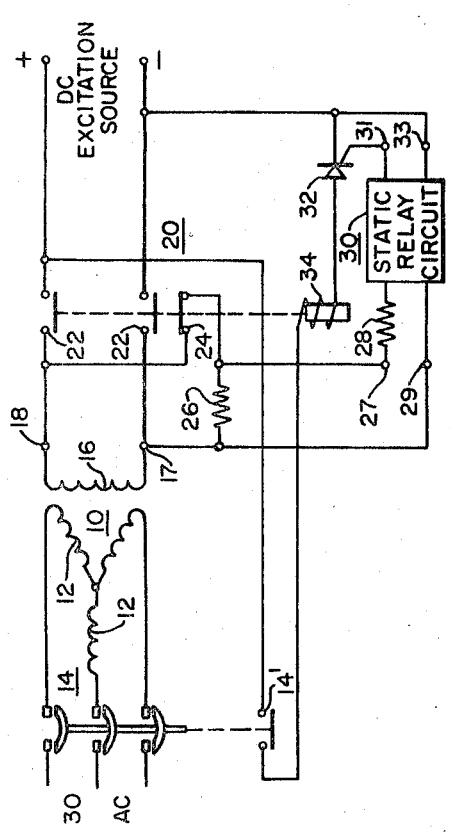
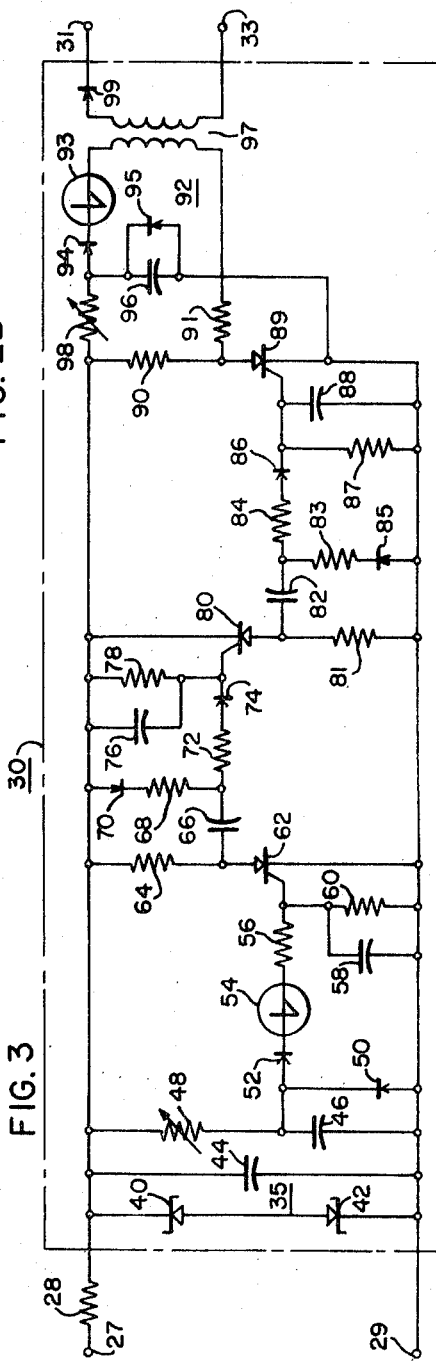

United States Patent Office

3,470,435
Patented Sept. 30, 1969

3,470,435
SYNCHRONOUS MOTOR FIELD CONTROL CIRCUIT
Arthur H. Hoffmann, Monroeville, Pa., assignor to Westinghouse Electric Corporation, Pittsburgh, Pa., a corporation of Pennsylvania
Filed June 6, 1967, Ser. No. 643,914
Int. Cl. H02p 5/28
U.S. Cl. 318—176                                 7 Claims

ABSTRACT OF THE DISCLOSURE

A circuit for controlling the application of excitation to the field of a synchronous machine. The excitation current is applied to the field through contactors of a switching means having an inherent delay in closing time. The circuit is connected across the field winding of the machine to sense the frequency and phase of the alternating slip voltage developed therein with rotation of the winding relative to an energized stator winding. The circuit comprises a first timing circuit for measuring the frequency of the voltage by timing its negative half cycle and for producing a breakdown potential across a diode when the voltage attains a predetermined frequency. The breakdown potential gates a switching device which is operable to energize a second circuit which produces an output signal during the following positive half cycle. The output signal energizes a second timing circuit which is operative to produce a pulse for energizing the contactor switching means during the next negative half cycle, at a time period before the next voltage zero equal to the time inherently required for the contactors to close.

RELATED APPLICATIONS

The present application discloses an improvement in the circuit shown and described in copending application Ser. No. 497,397, filed Oct. 18, 1965, by the present inventor and assigned to the present assignee, and now U.S. Patent 3,405,339.

BACKGROUND OF THE INVENTION

The present invention relates particularly to control systems in which direct current is applied to the field of a synchronous motor at an optimum time for synchronization. This is accomplished by exact control of field contactor energization based upon the precise sensing of the motor slip frequency as described in the above-mentioned prior application.

As pointed out in the prior application, actual delivery of the direct current to the motor field must occur at a time that will insure maximum stability in synchronization. Otherwise, the motor may slip back from synchronism and be tripped from the line, or the stator may momentarily draw more power from the line than is desired. As further explained, a major cause for inopportune timing is the delay time inherent in solenoid and contactor actuation, i.e., closing time.

To compensate for the time it takes to close the contactors after the solenoid is energized, the prior application employs two static timing circuits, the first of which senses the time of the positive half cycle of the motor slip frequency voltage. If the slip frequency is proper for synchronism, a diode breakdown potential develops and energizes the second timing circuit which produces a solenoid energizing pulse during the negative swing of the slip frequency voltage at a time period before the next voltage zero corresponding to the delay time inherent in contactor closing. By energizing the solenoid at such a time during the negative half cycle, direct current excitation is applied to the motor field at the beginning of the next positive swing of the slip cycle thereby making possible full use of the positive half cycle of slip voltage to develop optimum pull-in torque.

The above described circuit functions well with generally symmetrical width half cycles. In such cases, the positive half cycle is of appropriate duration to indicate the true speed of the motor for the slip frequency circuit to determine the proper speed for synchronizing. However, in certain applications, for example in a water wheel pump motor with its large inertia and low synchronizing slip frequency, the slip cycles are not always a symmetrical sine curve. The width of say the positive half cycle at low slip frequencies is not equal to the negative half cycle and usually is not of adequate duration to permit the timing capacitor to charge to the voltage level required for diode breakdown in the preferred time interval.

BRIEF SUMARY

The present disclosure describes a modification of the above described circuit which overcomes the difficulties that can be encountered with a variable width positive half cycle. The preferred embodiment of the modified circuit employs a second timing circuit connected across a third switching device and continuously activated by the slip frequency voltage.

In the present invention, the first timing circuit operates in essentially the same manner as described in the prior application except that the first timing circuit measures the slip frequency of the motor by measuring the duration of a first negative half cycle. If the frequency is proper for synchronization, a first switching device is turned on and causes a capacitor to charge until the next current reversal, at which time the capacitor discharges to gate a second switching device. In the prior application, the gating of this second switching device energized a second timing circuit during the negative half cycle which produced a field energizaing pulse at the critical time for motor synchronization. In the present invention, this second switching device, when gated, causes a second capacitor to charge during the positive half cycle; the capacitor discharges at the next current reversal of the half cycle which gates a third switching device. The current reversal begins the next negative swing of the slip frequency cycle, and it is during this cycle that the second timing circuit is adapted to produce an energizing pulse.

In the present invention, the second timing circuit includes a timing capacitor connected to be charged during each negative half cycle of the slip votlage frequency since the timing circuit is continuously energized by the slip voltage as mentioned earlier. The timing capacitor charges to the threshold voltage level of a trigger diode at a set time on the negative half cycle before the next voltage zero, to allow for the closing delay time of the field contactor. The trigger and discharge circuit is, however, completed only through the third switching device, so that until the third switching device is turned on, by virtue of a synchronizing signal being detected in the first portion of the static circuit, the discharge circuit is not completed to produce the field energizing pulse. When the discharge circuit is complete, by means of the previous negative half cycle having been measured as having the proper duration for synchronization, the second timing capacitor is permitted to discharge, to produce the energizing pulse. Thus, the second negative half cycle equal or longer than the previous negative half cycle is employed to compensate for the delay in contactor closing. In so doing, the direct current excitation is applied at or very near the slip cycle voltage zero to effect full utilization of the next half of the slip cycle in developing optimum pull-in torque.

BRIEF DESCRIPTION OF THE DRAWING

The advantages and objects of the invention will be more apparent from the following detailed description taken in conjunction with the accompanying drawing in which:

FIGURE 1 is a schematic representation of a synchronous motor control system using a field control circuit constructed in accordance with the principles of the present invention;

FIG. 2a is the slip cycle wave form described in the cited prior application;

FIG. 2b is a wave form representative of a slip voltage cycle accompanying synchronous rotor speed in certain types of rotating machines peculiar to the present invention; and FIG. 3 is a schematic diagram of the preferred embodiment of the control circuit employed in the system of FIG. 1, and operative with a slip cycle like that depicted in FIG. 2b.

DESCRIPTION OF PREFERRED EMBODIMENT

Specifically, there is shown schematically in FIG. 1 a synchronous motor 10 having any suitable power rating. The motor 10 has a three-phase stator winding 12 and field winding 16, both of which are physically constructed and mounted in any manner well known in the synchronous machine art. Though a three-phase motor is shown, the invention is not limited thereto.

The stator winding 12 is energized by a three-phase source of alternating current (not shown) through the closing of a suitable stator or main breaker 14. The field winding 16 is excited by a source of direct current (not shown) through the closing of contactors 22 connected to terminals 17 and 18 of the field winding.

The stator winding 12 produces a rotating magnetic flux in the air gap of motor 10 and thereby interacts with the motor field winding 16 and amortisseur windings (not shown) to produce start-up and synchronous operating torques for the rotor of motor 10. The field winding 16 and the amortisseur windings can be suitably disposed on a predetermined number of salient rotor poles in accordance with well established synchronous motor design principles.

During the start-up period, with the rotation of the field winding 16 through the magnetic field produced by the energized stator winding 12, a voltage is induced in the winding 16. If the circuit in which winding 16 is employed were left open, a high voltage build-up would occur in the field winding which could damage winding and pole insulation. Therefore, in order to reduce this induced voltage, a starting resistance 26 is connected across the winding 16 through a breaker means 24. The resistance 26 remains across the winding until synchronous rotor speed is reached or nearly reached, at which time the breaker opens in a manner to be more fully explained hereinafter. Substantial start-up torque near full speed can be derived from the resulting resistive component of current through the field windings. Special amortisseur windings or cage windings are usually provided on the rotor pole faces to produce an induction motor torque which, when combined with the torque produced by the closed field windings, provides the necessary or desired total start-up torque. After synchronism, the motor control circuitry 20 operates to open the field starting resistor circuit via the breaker 24. After the excitation voltage has been applied and the synchronization obtained, the resistance 26 would serve only to drain the field excitation current; therefore resistance 26 is removed and the circuit opened by the opening of the breaker 24.

The control circuit 20 operates generally to close the field excitation contactors 22 by measuring the frequency of the alternating current voltage induced in the winding 16 and appearing across the starting resistor 26.

Positive half slip cycles herein referred to designate the condition of induced voltage on the field winding 16 such that the terminal 17 is positive and the terminal 18 is negative. In this manner current flows in the field winding when the circuit is completed through the resistor 26 in the same direction that it will flow when the direct current excitation voltage is applied at synchronism to the field winding 16 through contacts 22. The measuring or sensing of this voltage frequency (slip frequency) is accomplished by a static, solid state control circuit generally designated 30 in FIG. 1. When the rotor of the motor 10 reaches a near synchronous speed, the static control circuit 30 produces an output signal that is applied to the gate of a solid state switching device 32 which may take the form of a thyristor or controlled rectifier. The output signal from the circuit 30 turns on the switching device 32 which causes a current path to be completed through an operating coil 34 which closes the field contactor 22 when energized. The energization of the coil 34 further operates to open the breaker 24 which may be a back contact on the field contactor unit. Thus, when contactor 22 closes to apply direct current excitation to the field of motor 10, the breaker 24 opens to remove the resistor 26 from across the field winding 16 and the excitation circuit.

An interlocking contactor 14', connected in series with the coil 34, is provided to prevent the application of excitation voltage when the stator windings 12 are not energized. The contactor 14' is an auxiliary contactor forming part of the main breaker 14.

Input terminals 27 and 29 are provided for connecting the static circuit 30 across the field winding 16 and starting resistor 26 so that the slip frequency voltage can be applied to the circuit through a current limiting resistor 28. Similarly, the output of the static circuit 30 is provided with terminals 31 and 33 which are connected respectively to the gate and cathode of the switching device 32.

In the arrangement described in the prior art above cited application, the slip voltage frequency appears across the starting resistor 26 and has generally a uniform wave form with substantially equal width half cycles. With a motor speed (and slip frequently) appropriate for synchronization, the direct current excitation is delivered to the field winding 16 at an optimum time A on the slip cycle as shown in FIG. 2a. To have the excitation current applied at time A, the field contactor coil 34 was energized at a time E prior to A during the negative swing of the slip cycle to allow for the delay in contactor closing time. A timing capacitor in the prior circuit charges during the negative cycle for a period of time equal to D and E as indicated by ramp line e in FIG. 2a. At time point E, the capacitor discharges through a trigger diode to provide the field contactor coil 34 with an energizing signal.

As mentioned earlier, and as indicated in FIG. 2b, certain types of machines produce slip frequnecy half cycles that are not nearly equal in time. With such a cycle configuration, the time of say the positive half cycle is shorter to the extent that the level of charge acquired by the slip frequency timing capacitor is inadequate to trigger the diode actuating the second timing circuit. In such a case, direct current excitation is not applied to the machine 10 even though the motor speed and slip frequency are proper for synchronization.

The present invention solves this problem by using a first negative half cycle (C to D in FIG. 2b) of the slip frequency for charging the slip frequency timing capacitor, as opposed to the first positive half cycle employed in the prior disclosure and shown in FIG. 2a. The timing capacitor senses the proper frequency of voltage across the starting resistor 26.

A second succeeding negative half cycle of slip frequency (F to A in FIG. 2b) is used for charging a second timing capacitor to produce the field energizing signal. This is accomplished by the static circuit 30 shown in schematic detail in FIG. 3.

In the present invention and in the prior cited application, the static circuits operate to provide an output signal at time E for energization of the field contactor coil 34 at time E so that at time A, direct current excitation is applied to the field winding 16 through the closing of the field contactors 22.

The first portion of the static circuit 30 is the same as that shown in the prior application. Thus the slip frequency voltage of the motor is applied directly to an input portion 35 of the circuit 30 through the current limiting resistor 28 to a pair of Zener diodes 40 and 42 and a capacitor 44. The Zener diodes are connected across an RC energy storage and timing circuit comprising adjustable resistor 48 and timing capacitor 46. The Zener diodes produce a clipped and reduced voltage (see FIG. 2). for application to the components of the static circuit 30 so that lower rated circuit components can be used therein while simultaneously providing a standardized static circuit for employment with motors of various ratings. The purpose of capacitor 44 will be explained in the overall operation of the circuit 30.

The timing capacitor 46 and the adjustable resistor 48 are connected (at their common junction) to two reverse current blocking diodes 50 and 52, the cathode of the diode 52 being further connected to a trigger diode 54. The trigger diode, in turn, is serially connected to one lead of a current limiting resistor 56, the other lead of which is commonly connected to a filter capacitor 58, a resistor 60 and the gate terminal of a switching device 62, the resistor 60 being a bias setting means for the switching device.

The switching device 62 is connected across the input portion 35 of the circuit 30 with the cathode thereof being connected directly to the input portion, and the anode thereof being connected to the input portion through a current limiting resistor 64. The anode is further connected to a capacitor 66 forming part of a second switching circuit presently to be explained. The capacitor 66 is further commonly connected to a charging resistor 68 and a current limiting resistor 72, the resistors being respectively connected to reverse current blocking diodes 70 and 74. The cathode of the diode 74 is commonly connected to a filter capacitor 76, to a resistor 78 and to the gate terminal of a second switching device 80. The resistor 78 is the bias setting means for the second switching device, and the capacitor 76 is a filter means for suppressing high frequency voltage spikes.

The second switching device 80 is connected across the input portion of the circuit 30, the anode of the device 80 being connected through a resistor 81. The anode is further connected to an input capacitor 82 for a third switching circuit presently to be described. The input capacitor, in turn, is commonly connected to resistors 83 and 84 which are respectively connected to blocking diodes 85 and 86. The cathode of the diode 86 is commonly connected to a resistor 87, a capacitor 88 and the gate terminal of a third switching device 89. Like their corresponding components in the two previous switching circuits, the resistor 87 and capacitor 88 form bias setting and spurious high frequency filtering in the gate circuit of the third switching device 89.

The third switching device 89 is connected across the input portion 35 of the circuit 30 with the anode of the device being connected thereto through a current limiting resistor 90. The anode of the device 89 is further connected to a second current limiting resistor 91 which forms part of an output circuit 92 connected across the resistor 90 and the third switching device.

The output circuit 92 includes further an adjustable resistor 98 and a capacitor 96 which form a timing circuit, connected to blocking diodes 94 and 95, a trigger diode 93 and the primary winding of an isolation pulse transformer 97.

The timing capacitor 96 is connected between the adjustable resistor 98 and the cathode terminal of the switching device 89. A modification of this circuit would include connecting the timing capacitor between the adjustable resistor and the anode terminal of the switching device. With such an arrangement, all of the output circuit 92 would then be connected in the anode circuit of the switching device 89.

In operation, the Zener diodes 40 and 42 clip the slip frequency voltage applied to the input terminals 27 and 29 as mentioned earlier. The timing capacitor 46 charges with current drawn through adjustable resistor 48 until the charge reaches the threshold voltage level of the trigger diode 54 as indicated by ramp line c in FIG. 2b. Such a voltage level is attained when the rotor of motor 10 attains a near synchronous speed as indicated by the first negative half cycle of the slip voltage cycle shown in FIG. 2b. The time C to G of the first negative half cycle is measured by the RC circuit comprising the capacitor 46 and the adjustable resistor 48, the time constant of the RC circuit being set by the adjustable resistor.

When the breakdown voltage level of the trigger diode 54 is attained, the diode conducts (from time G to D) to provide a switching pulse effective to turn on the first switching device 62. The voltage of the Zener (clipping) diodes now appears across the resistor 64 in the cathode circuit of the switching device. This voltage causes the capacitor 66 to charge with current flow through the diode 70, the resistor 68 and the switching device 62. The capacitor 66 holds its charge until the slip voltage on the terminals 27 and 29 reverses (time D in FIG. 2b).

From time D to F (the positive half cycle), a reverse polarity is applied across the switching device 62 which switches the device to an off or nonconductive state. Reverse current is blocked from flowing through the resistor 68 by the diode 70 so that the capacitor 66 discharges through resistor 72, diode 74, and resistors 78 and 64. The discharge current gates the second switching device 80 which completes a circuit between the input terminals 27 and 29 through the resistor 81 in the anode circuit of the switching device. The clipped voltage of the Zener diodes 40 and 42 now appears across the resistor 81 so that the capacitor 82 (connected thereto) charges with current flow through the diode 85, the resistor 83 and the switching device 80. The capacitor holds its charge until the slip voltage again goes negative (time F in FIG. 2b) with the reversal of polarity on terminals 27 and 29. From time F to A, a reverse polarity is applied across the switching device 80 which switches the device to an off or nonconductive condition in a manner similar to that of the first switching device 62. Reverse current flow through the resistor 83 is blocked by the diode 85 so that at time F the capacitor 82 discharges through the resistor 84, the diode 86 and resistors 87 and 81. The discharge current gates the third switching device 89 which places the clipped voltage from the Zener diodes 40 and 42 across the resistor 90. The conduction of the third switching device and voltage establishment across the resistor 90 occurs at a time substantially close to F on the slip cycle.

The energy storage and timing circuit in the output circuit 92 is continuously activated by the clipped slip frequency input voltage since it is permanently and directly connected to the input portion 35 of the circuit 30. Thus, with the switching device 89 in an off condition, the timing capacitor 96 charges during each negative half cycle, and discharges during each positive half cycle. During the negative half cycle, the capacitor 96 charges with current flow through the adjustable resistor 98 but it cannot discharge through the trigger diode 93 and the primary winding of the transformer 97 to produce a field energizing signal since the discharge circuit is open when the third switching device 89 is in an off condition.

When the speed of motor 10 reaches a near synchronous speed, the three switching devices 62, 80 and 89 are turned on sequentially in the manner described above.

When the third switching device 89 is turned on, which occurs substantially at time F (FIG. 2b), the circuit through the trigger diode 93, the transformer primary and the current limiting resistor 91 is completed. At time F, which begins the next negative half cycle after the first negative half cycle measured for a synchronous slip frequency, the timing capacitor 96 begins to charge as indicated by ramp line in FIG. 2b. The capacitor charges to a point E on the slip cycle, at which time the diode 93 triggers or breaks down to allow discharge of the capacitor 96 therethrough and through the switching device 89. The discharge produces a switching signal to gate the field switching device 32 (FIG. 1) by virtue of the current flow through the isolating pulse transformer 97. The switching device 32 conducts to cause actuation of the field contactor coil 34 and the closing of the contactors 22.

The charging time F to E on the slip cycle is chosen in advance of the next voltage zero (time A) to allow time for the field contactors 22 to close so that at time A, the direct current excitation voltage is applied to the field 16 of the motor 10 to effect full utilization of the next half cycle to develope optimum pull-in torque.

The charging time F to E of the capacitor 96 is set by adjustment of the resistor 98.

When the trigger diode 93 conducts, the discharge current from capacitor 96 is supported by discharge from capacitor 44 (in the input circuit 35) and both are applied to the field switching device 32 through the pulse isolation transformer 97. The capacitor 44 accumulates stored energy in the negative half cycle during time F to E to provide an increase in the total available energy for generating the field energizing pulse when the trigger diode 93 conducts. The resistor 90 has a resistance value which allows the switching device 89, when gated, to maintain its holding current until the capacitors 44 and 96 discharge.

The diodes 94, 95 and 99 serve to block reverse current in their allotted circuits.

From the foregoing description it should now be apparent that an improved control circuit has been disclosed which uses the longer, more uniform (negative) half cycle for complementing the delay in field contactor closing time to insure proper timing and application of direct current excitation voltage to the field of a synchronous motor 10. By exciting the motor field at the optimum time, that is at the proper motor speed and field pole position, synchronization is assured with maximum stability and minimum fluctuation of electrical power. In addition, by using small, lightweight components, the entire control unit can be fitted into a small package with adjustable controls (resistors 48 and 98) available for easily effecting changes in timing circuit parameters to accommodate changes in machine and circuit components.

Though the invention has been described with a certain degree of particularity, it should be understood that the disclosure has been made by way of example only and that changes may be made therein without departing from the spirit and scope of the invention. For example, the transformer 97 is one of several means for delivering pulses to the gate of the switching device 32.

What is claimed is:
1. A synchronous machine system having a rotating field winding and a supply of direct current excitation,
 a control system for controlling the supply of excitation current to the field including a switching means having an inherent delay in closing time,
 a first timing circuit for measuring the frequency of the slip frequency voltage of the rotating field by measuring the time of one half-cycle of one polarity of the slip frequency voltage,
 at least one switching device connected to be gated when the timing circuit measures a slip frequency proper for machine synchronization,
 an intermediate circuit connected to said switching device, said circuit adapted to be made operative when said device is gated and to remain operative during the next half cycle of the slip frequency voltage of the polarity opposite to that of said one polarity,
 an output circuit including a second timing circuit connected to said intermediate circuit, said output circuit having an open circuit portion for the duration of said cycle of opposite polarity, said intermediate circuit being effective to close said open circuit portion at the end of the cycle of said opposite polarity,
 the output and timing circuits being operative to produce an output signal during the next half cycle of said one polarity of the slip frequency voltage, and at a time before the next voltage zero of the slip frequency corresponding to said delay in closing time of the field switching means, and
 means for energizing the field switching means in response to the output signal produced by the second timing circuit.

2. The system of claim 1 wherein the field switching energizing signal gates a switching device connected in series with the field switching means.

3. The system of claim 1 wherein the first timing circuit is connected across the field winding of the synchronous machine.

4. The system of claim 1 in which the first timing circuit is adapted to measure the frequency of the slip frequency voltage by measuring the time of its negative half cycle, and
 the second timing circuit is adapted to produce the output signal during the negative cycle of the slip frequency immediately following the negative half cycle having a slip frequency proper for synchronization.

5. In a circuit controlling the application of direct current excitation to the field of a synchronous machine when the frequency of an alternating slip voltage is proper for synchronization, the circuit including
 a first timing circuit for measuring the frequency of said voltage and for producing a triggering potential across a diode when said voltage attains a predetermined frequency, the first timing circuit adapted to measure during a half-cycle of one polarity of the alternating voltage,
 first and second switching devices,
 the triggering potential produced in the first timing circuit being effective to gate the first switching device,
 an intermediate circuit connected between said switching devices, said circuit adapted to be made operative when said first switching device is gated and to remain operative during the next half-cycle of the slip frequency voltage of the polarity opposite to that of said one polarity,
 said intermediate circuit being effective to gate the second switching device when the slip voltage is proper for synchronization, and
 a second timing circuit including a timing capacitor connected to the second switching device, and operative to acquire a diode triggering potential at a predetermined length of time after the beginning of the next succeeding half-cycle of said one polarity,
 the second switching device being operative to complete a discharge circuit for the diode triggering potential acquired in the second timing circuit when the second switching device is gated,
 the discharge circuit being adapted to produce a switching pulse.

6. The control circuit of claim 5 in which the first timing circuit is adapted to measure the time of the negative half cycle of the alternating voltage, and
 the second timing circuit acquires its diode triggering potential during the next negative half cycle following the intervening positive half cycle.

7. The control circuit of claim 5 in which the timing capacitor in the second timing circuit is connected to be charged by the half cycle voltage of said one polarity.

References Cited

UNITED STATES PATENTS

| | | | |
|---|---|---|---|
| 3,350,613 | 10/1967 | Brockman et al. | 318—193 XR |
| 3,405,338 | 10/1968 | Frola | 318—193 XR |
| 3,405,339 | 10/1968 | Hoffmann | 318—193 XR |

ORIS L. RADER, Primary Examiner

G. Z. RUBINSON, Assistant Examiner

U.S. Cl. X.R.

318—181, 183, 193